US005361199A

United States Patent [19]
Shoquist et al.

[11] Patent Number: 5,361,199
[45] Date of Patent: Nov. 1, 1994

[54] AUTOMATED PROCUREMENT SYSTEM WITH MULTI-SYSTEM DATA ACCESS

[75] Inventors: Kenneth M. Shoquist, Plano; Gary C. Young, Dallas; Amy L. Mathis, Plano; Bob W. Withers, Allen, all of Tex.

[73] Assignee: Texas Instruments Incorporated, Dallas, Tex.

[21] Appl. No.: 560,942

[22] Filed: Jul. 31, 1990

[51] Int. Cl.$^5$ .............................................. G06F 15/20
[52] U.S. Cl. ........................................ 364/401; 364/403
[58] Field of Search ............... 364/401, 408, 403; 395/145, 146, 148, 149, 155, 157, 161, 200, 600, 925, 650

[56] References Cited

U.S. PATENT DOCUMENTS

| | | | |
|---|---|---|---|
| 4,635,189 | 1/1987 | Kendall | 364/DIG. 1 |
| 4,851,988 | 7/1989 | Trottier et al. | 364/DIG. 1 |
| 4,897,781 | 1/1990 | Chang et al. | 395/600 |
| 4,939,689 | 7/1990 | Davis et al. | 364/DIG. 2 |
| 4,961,148 | 10/1990 | Holda et al. | 364/468 |
| 5,008,853 | 4/1991 | Bly et al. | 364/DIG. 2 |
| 5,101,352 | 3/1992 | Rembert | 364/401 |
| 5,101,353 | 3/1992 | Lupien et al. | 364/408 |
| 5,109,515 | 4/1992 | Laggis et al. | 395/725 |
| 5,124,909 | 6/1992 | Blakely et al. | 395/200 |
| 5,136,501 | 8/1992 | Silverman | 364/408 |
| 5,208,665 | 5/1993 | McCalley et al. | 358/86 |

Primary Examiner—Roy N. Envall, Jr.
Assistant Examiner—A. Bodendorf
Attorney, Agent, or Firm—W. Daniel Swayze, Jr.; Leo N. Heiting; Richard L. Donaldson

[57] ABSTRACT

An automated procurement system, in which a buyer workstation is in communication with a mainframe database that stores global data relevant to procurement documents and reports. The workstation is programmed with an interactive buyer interface that displays procurement documents, provides support data to aid in decision-making, and provides various document attachments. Data is uploaded and downloaded to and from the mainframe and the workstation in a manner that is transparent to the buyer.

8 Claims, 25 Drawing Sheets

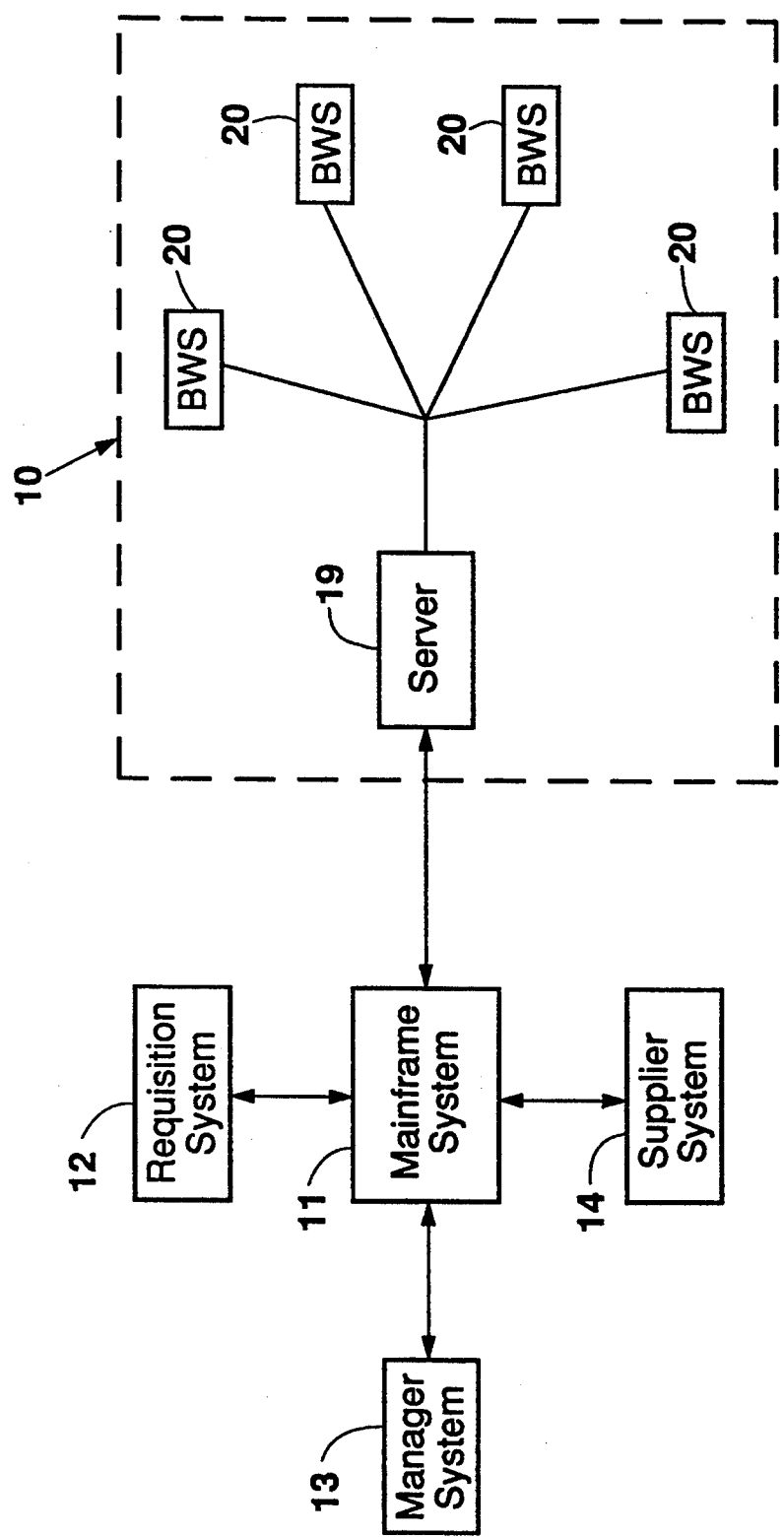

Fig. 2

```
┌─────────────────────────────────────────────────────────┐
│ ▢            Buyer Workstation              ⇦  ⇨        │
│ Work Lists  Admin  Support  Windows  BWSW1008!   F1=Help│
├─────────────────────────────────────────────────────────┤
│ ⇦                                                       │
│                   Buyer Statistics                      │
│                                                         │
│   Buyer Number    0    A/O    00:00                     │
│                                                         │
│  RPs:                                                   │
│        Waiting Buyer Action      0    New    0          │
│        Waiting Documentation     0    New    0          │
│           Supplier Proposal      0    New    0          │
│        Waiting Supplier Action   0                      │
│                                                         │
│        All Quotes Received       0    New    0          │
│        Partial Quotes Received   0    New    0          │
│        All Quotes Outstanding    0                      │
│                                                         │
│  PO Change Request:                                     │
│        Waiting Buyer Action      0    New    0          │
│           Supplier Proposal      0    New    0          │
│        Waiting Supplier Action   0                      │
│                                                         │
└─────────────────────────────────────────────────────────┘
```

Fig. 4

Buyer Workstation

Work Lists  Admin  Support  Windows      F1=Help

BWSW1008I

RP Work List - RP Sequence

Sel 0

| RP Number | TI Part No/ Description | Need Date | Queue Date | Stat | Extended Price |
|---|---|---|---|---|---|
| 14632522-01 | 2247679-0002 | UNSCH | 03/07/89 | BUYN | 89.50 |
| - 140623535-01 | 2221574-0001 | UNSCH | 03/07/89 | BUYN | 185.50 |
| - 140632539-01 | 2220682-0001 | UNSCH | 03/13/89 | BUYN | 13000.00 |
| - 140632540-01 | 2220623-0008 | UNSCH | 03/07/89 | BUYN | 186.00 |
| - 140632551-01 | 0996283-0001 | UNSCH | 03/07/89 | BUYN | 4000.00 |
| - 140637034-01 | 2782241-0001 | UNSCH | 04/14/89 | BUYN | 9065.00 |
| - 140637216-01 | 2451821-0001 | UNSCH | 04/17/89 | BUYN | 215.00 |
| - 140637219-01 | 2540241-0001 | UNSCH | 04/17/89 | BUYN | 311.25 |
| - 140637220-01 | 2548323-0003 | UNSCH | 04/20/89 | BUYN | 1337.60 |
| - 140637221-01 | 2548236-0001 | UNSCH | 04/20/89 | BUYN | 15694.00 |
| - 140637223-01 | 2544592-0001 | UNSCH | 04/28/89 | BUYN | 0.42 |
| - 140637224-01 | 2546162-0001 | UNSCH | 04/28/89 | BUYN | 0.40 |
| - 140637225-01 | 2545666-0001 | UNSCH | 04/20/89 | BUYN | 0.25 |
| - 140637226-01 | 2546621-0001 | UNSCH | 04/28/89 | BUYN | 0.05 |
| - 140637228-01 | 2542556-0001 | UNSCH | 04/28/89 | BUYN | 10200.00 |
| - 140637229-01 | 2542556-0001 | UNSCH | 04/28/89 | BUYN | 1225.00 |
| - 140637234-01 | 25424470-0004 | UNSCH | 04/20/89 | BUYN | 1012.50 |
| - 140637235-01 | 2311110-0001 | UNSCH | 04/17/89 | BUYN | 420.00 |
| - 140637236-01 | 2311108-0004 | UNSCH | 04/20/89 | BUYN | 1177.50 |

Fig. 5

| Buyer Workstation | | | |
|---|---|---|---|
| Work Lists | Admin | Support | Windows   BWSW1008I   F1=Help |

Sel 0

| RP Number | TI P Des | | Extended Price |
|---|---|---|---|
| -140632522-01 2247679 | | t N | 89.50 |
| -140623535-01 2221574 | | N | 185.50 |
| -140632539-01 2220682 | | N | 13000.00 |
| -140632540-01 2220623 | | N | 186.00 |
| -140632551-01 0996283 | | N | 4000.00 |
| -140637034-01 2782241 | | N | 9065.00 |
| -140637216-01 2451821 | | N | 215.00 |
| -140637219-01 2540241 | | N | 311.25 |
| -140637220-01 2548323 | | N | 1337.60 |
| -140637221-01 2548236 | | N | 15694.00 |
| -140637223-01 2544592 | | N | 0.42 |
| -140637224-01 2546162 | | N | 0.40 |
| -140637225-01 2545666 | | N | 0.25 |
| -140637226-01 2546621 | | N | 0.05 |
| -140637228-01 2542556 | | N | 10200.00 |
| -140637229-01 2542556 | | N | 1225.00 |
| -140637234-01 2542470 | | N | 1012.50 |
| -140637235-01 2311110 | | N | 420.00 |
| -140637236-01 2311108 | | N | 1177.50 |

RP WorkList Sort Options

Starting Key:

1 RP Number
BWS Sort Key
Assigned Supplier
Selected Supplier
3 Status
Expedite Code
Need Date vs Lead Time
Need Date
Queue Date
2 TI Part
Mfg Part

[ OK ]   [ Cancel ]   [ Clear ]

[ Save Options ]   [ Set Defaults ]

Fig. 6

```
┌─────────────────────────────────────────────────────────┐
│ ▭                    Buyer Workstation            ⇦  ⇨  │
├─────────────────────────────────────────────────────────┤
│ Work Lists  Admin  Support  RP Attachments  Actions  Display  Windows    F1=Help │
├─────────────────────────────────────────────────────────┤
│ ▭        RP 140637228 Item 01 Detail               ⇦    │
│ ┌─────────────────────────────────────────────────┬──┐  │
│ │ ↑                                                │↑ │  │
│ │                                                  │  │  │
│ │ BWS Sort Key _____          Status BUYW        │  │  │
│ │                               Queue Date 04/28/89│  │  │
│ │ Tracking # 0637228            Sugg PO # _____  │  │  │
│ │                               Create Date 04/12/89│ │  │
│ │ Sub Items?       No                              │  │  │
│ │ Contingent Items? No          Responsibility  JOHN DOE │
│ │ Comments?        No                       0      │  │  │
│ │ System Messages? No                              │  │  │
│ │                               Receivable   Yes   │  │  │
│ │ Item Total  $ 10,200.00       TI Inspect   Yes   │  │  │
│ │                                    Stock   Yes   │  │  │
│ │ Item Type     MTL Material                       │  │  │
│ │ Account Type  Inventory       Send MFG Part  No  │  │  │
│ │                                                  │  │  │
│ │ TI Part # 2542556-0001                           │  │  │
│ │ MFG Part # _____         Rev ___  Pln Ctr 0 DLD ___│
│ │ Military Part # _____                       Mark ___│
│ │                                                  │  │  │
│ │ Description │IC,SRAM,CY7C164,16K X 4,25NS│       │  │  │
│ │                                                  │  │  │
│ │             Commodity 59624100                   │  │  │
│ │             IC DIGITAL MEMORIES                  │  │  │
│ │ ↓                                                │↓ │  │
│ └─────────────────────────────────────────────────┴──┘  │
└─────────────────────────────────────────────────────────┘
```

Fig. 7

| Work Lists | Admin | Support | RP Attachments | Comments | Actions | Display | Windows | | F1=Help |

Buyer Workstation

Detail

BWS Sort Key    Status BUYW
     Queue Date 04/20/89
RP # 140637   | Schedules
       Sub-Items    Sugg PO #
Tracking # 0637228 | Special Clauses   Create Date 04/12/89
    Sub Items? N | Quotes
  Contingent Items? N | *Signatures*    JOHN DOE
    Comments? N | Routing    Responsibility 0
  System Messages? N | Alternate Ship To Address
       | Payment Schedules    Receivable Yes
Item Total $ 1,072.50 | |    TI Inspect Yes
      | *File Documents*    Stock Yes
Item Type MTL Material | System Messages
Account Type Inventory    Send MFG Part No TI Part # 2311097-0001
MFG Part # _____ Rev ____ Pln Ctr 0    DLD ____
Military Part # _____                 Mark ____

Description | WARNESS, DC WIREING |

Commodity 59951110
IC DIGITAL MEMORIES

Fig. 8A

Buyer Workstation

Work Lists  Admin  Support  RP Attachments  Actions  Display  Windows         F1=Help RP 140638092 Item 01 Detail Delivery Schedules Qty Ordered 25          Qty Requested 25
Qty Unscheduled 0       Balance to Schedule 0

Routing Transit Time 0

Need
Quantity  Date          Quantity    Date
          00/00/00                  0  06/12/89

| Buyer Workstation | | | | | | | | |
|---|---|---|---|---|---|---|---|---|
| Work Lists | Admin | Support | RP Attachments | Actions | Display | Windows | | F1=Help |

RP 140638092 Item 01 Detail

Quote Spreadsheet

Unit Price 0.00   Base Price
U/P EA         Lowest Recent History
Order Qty 25   Target Price                130.00
U/M EA         Extended Target           3,250.00

Add Supplier: No: 0
Name: _____

Supplier   Status   SPM   Unit Quote   Extended Quote   Delta To Target   Add To Date

Fig. 9

Buyer Workstation

Work Lists  Admin  Support  RP Attachments  Actions  Display  Windows   F1=Help

140637228 Item 01 Detail

Sourcing
Commodity Search
BWS Sort  Supplier Search           Status BUYW
         History Search             Queue Date 04/20/89
RP       Agreement Search
Tracking  Standard Clauses          Sugg PO #
         Forms Search               Create Date 04/12/89
Su
Continge  On Order                  JOHN DOE
Comments? No                        Responsibility 0
System Messages? No Item Total $ 1,072.50               Receivable Yes
                                    TI Inspect Yes
Item Type MTL Material              Stock Yes
Account Type Inventory              Send MFG Part No TI Part # 2548236-0001      Rev ____  Pln Ctr 0      DLD ____
MFG Part # ____                                       Mark ____
Military Part # ____

Description  IC,RAM,DYN,256K X 4 -BIT,100NS TACC,PDI

Commodity 59624120
             IC DIGITAL MEMORIES

Fig. 10

| | Buyer Workstation | | | | | | | | |
|---|---|---|---|---|---|---|---|---|---|
| Work Lists | Admin | Support | Actions | Display | Windows | | | | F1=Help |

Bws Sourcing Support 00000000000
00000000
○ TI Part Number  2219926-0001          00 Y Buying Division # 014 DSG                    Supplier Name

GROUP RATING                                              $

| Supplier | Group | Type | SSM | TIIES | SPM | DVL | Qual | Price | Loc | Agrm |
|---|---|---|---|---|---|---|---|---|---|---|
| - XYZ, INC | DSG | S M | C | No | 1.10 | 020 | 100. | | | |
| - ABC CO. | DSG | S M | N | No | 1.00 | 100 | 100 | | | |
| - ALL CO. | DSG | M | A | N/A | N/A | N/A | N/A | | | |

Fig. 11

Buyer Workstation

Work Lists   Admin   Support   RP Attachments   Actions   Display   Windows         F1=Help RP 140637221 Item 01 Detail Commodity Code Search - Alphabetic                           Assigned 59624120

Page To [____]         Search For _____
Commodity Code            Description

- 53500500    ABRASIVE MATERIAL(INCLUDES POLISHING COMPOUNDS)
- 53500000    ABRASIVE MATERIALS
- 53450000    ABRASIVES;DISKS & STONES
- 60700100    ACCESSORIES, FIBER OPTIC

- 72400000    ACCOUNT/CALCULATE MACH
- 72409000    ACCOUNTING & CALCULATING MACH.,MISC.
- 68502200    ACIDS, SPECIAL MIXES FOR CLEANING
- 70250809    ACOUSTIC COUPLER, DP EQUIP, SPARE PART

- 59301430    ACTUATOR, AXILIARY, SWITCH SENSITIVE
- 13361000    ACTUATOR, EXPLOSIVE
- 30100310    ACTUATOR, LINEAR
- 30100320    ACTUATOR, ROTORY

- 30100300    ACTUATORS
- 16800200    ACTUATORS, AIRCRAFT ACC & COMP, MISC
- 99052000    AD DISPLAYS
- 60600100    ADAPTER, CONNECTOR, FIBER OPTIC

Fig. 12A

Buyer Workstation

Work Lists  Admin  Support  RP Attachments  Actions  Display  Windows                    F1=Help

RP 14063

| Actions menu |
|---|
| Save Changes |
| Restore to Original |
| Find RP... |
| Return to Requisitioner |
| Send RP to Supplier |
| Send for Quotes |
| Attachments Received |
| Make PO |
| Add Item to Open PO |
| Send for Signatures |
| Print RP |
| Print Quote |
| Buyer Reassignment |
| Emergency PO |

BWS Sort Key                          s BUYW    ate 04/20/89
RP # 140632522-01
Tracking # 0632522                    O #        ate 04/12/89
Sub Items?  No
Contingent Items?  No                 N  DOE
Comments?  No                         lity 0
System Messages?  No
Item Total  $ 89.50                   le  Yes
                                      ct  Yes
                                      k   Yes
Item Type MTL Material                art No
Account Type Inventory TI Part # 2247679-0002 _____ Rev _____ Pln Ctr 0 _____ DLD _____
MFG Part # _____                                              Mark _____
Military Part # _____

Description | PATCH CORD, .825" SQ. SOCKET |

Commodity 59950210
IC DIGITAL MEMORIES

Fig. 12B

| Work Lists | Admin | Support | RP Attachments | Actions | Display | Windows | | | F1=Help |
|---|---|---|---|---|---|---|---|---|---|

Buyer Workstation

Sel 212

RP Work Lis...

| RP Number | TI Part No/ Description | | | Stat | Extended Price |
|---|---|---|---|---|---|
| | | | Return to Requisitioner | | |
| | | | Send RP to Supplier | | |
| | | | Send for Quotes | | |
| -140632522-01 | 2247679-0002 | UNS | Attachments Received | BUYN | 89.50 |
| -140623535-01 | 2221574-0001 | UNS | Make PO | BUYN | 185.50 |
| -140632539-01 | 2220682-0001 | UNS | Add Item to Open PO | BUYN | 13000.00 |
| -140632540-01 | 2220623-0008 | UNS | Send for Signatures | BUYN | 186.00 |
| | | | Print RP | | |
| -140632551-01 | 0996283-0001 | UNS | Print Quote | BUYN | 4000.00 |
| -140637034-01 | 2782241-0001 | UNS | Buyer Reassignment | BUYN | 9065.00 |
| -140637216-01 | 2451821-0001 | UNS | Emergency PO | BUYN | 215.00 |
| -140637219-01 | 2540241-0001 | UNS | | BUYN | 311.25 |
| | | | WorkList Sort Options | | |
| -140637220-01 | 2548323-0003 | UNS | WorkList Select Options | BUYN | 1337.60 |
| -140637221-01 | 2548236-0001 | UNS | | BUYN | 15694.00 |
| -140637223-01 | 2544592-0001 | UNS | Mark All | BUYN | 0.42 |
| -140637224-01 | 2546162-0001 | UNS | Clear All | BUYN | 0.40 |
| -140637225-01 | 2545666-0001 | UNS | Update BWS Sort Key | BUYN | 0.25 |
| -140637226-01 | 2546621-0001 | UNS | Update Selected Supplier | BUYN | 0.05 |
| -140637228-01 | 2542556-0001 | UNSCH | 04/28/89 | BUYN | 10200.00 |
| -140637229-01 | 2542556-0001 | UNSCH | 04/28/89 | BUYN | 1225.00 |
| -140637234-01 | 2542470-0004 | UNSCH | 04/20/89 | BUYN | 1012.50 |
| -140637235-01 | 2311110-0001 | UNSCH | 04/17/89 | BUYN | 420.00 |
| -140637236-01 | 2311108-0004 | UNSCH | 04/20/89 | BUYN | 1177.50 |

Fig. 13

Buyer Workstation

Work Lists  Admin  Support  Actions  Display  Windows

F1=Help

PO Work List Specifications

Supplier Abbr [____]
Supplier Number ____-____

Po Number ____

Item Type ____
Change Request ____
Receivable Y/N ____
Payment Schedules ____
Commodity Code 0
Part Number ____
Std Ti Part Y/N ____
Mfg Part Number ____

Team Name ____
Buyer Number 2284

Beginning Item Open Date __/__/__

All Unreceived ____
Deliquent ____
Overships ____
Shipments Due Before __/__/__
Unscheduled Shipments ____

Account Type ____
Cost Center ____
Work Order ____

Fig. 14

| | | Buyer Workstation | | |
|---|---|---|---|---|
| Work Lists | Admin | Support | Actions | Display | Windows | | | F1=Help |

PO Work List - PO Sequence

Sel 0                                                                                           04

| PO # | Status | Next Sched Date | Total Value | Part #/Description |
|---|---|---|---|---|
| 000398735-01 | PO O | | 0.10 | SADEASDF |
| 002101865-01 | PO O | | 1,997.00 | COLOR SEPARATIONS |
| 002101865-02 | PO O | | 0.00 | COLOR SEPARATIONS |
| 002101865-03 | PO O | | 0.00 | COLOR SEPARATIONS |
| 002365962-01 | PO O | | 1,108.00 | LUGGAGE TAP (PPC) |
| 002372148-01 | PO O | | 19,739.90 | SLIDE SHOW |
| 002372284-01 | PO O | | 7,676.25 | PRINTING OF RESELTS |
| 002372385-01 | PO O | | 439.32 | GAME PLAN COVER |
| 002372399-01 | PO O | | 3,769.00 | 3-RING BINDER |
| 002372399-02 | PO O | | 2,700.00 | SLIP CASE FOR ITEM |
| 002372399-03 | PO O | | 400.00 | DISKETTE HOLDER |
| 002372433-01 | PO O | | 2,555.35 | BASELINE ART, SET |
| 002372452-01 | PO O | | 60.97 | MISCELLANEOUS ART |
| 002380020-01 | PO O | | 5,088.00 | CREATE ARTWORK FRO |
| 002380033-01 | PO O | | 7,770.00 | 880 PRINT USER |
| 002380033-02 | PO O | | 3,195.00 | QUICK REF. TEXT |
| 002380051-01 | PO O | | 2,700.00 | COMPLETION & REPOR |
| 002380076-01 | PO O | | 995.00 | PRINT FORMAT MUST |
| 002380182-01 | PO O | | 1,111.92 | HALF-HEIGHT WIINDOW |

Fig. 16

```
┌─────────────────────────────────────────────────────────┐
│ ═  Buyer Workstation                              ⇩ ⇧   │
│ Work Lists  Admin  Support  RP Attachments  Actions  Display  Windows    F1=Help │
│ ┌─────────────────────────────────────────────────────┐ │
│ │ ⇦  PO 002668580 Item 01 Detail                       │ │
│ │                                                      │ │
│ │ BWS Sort Key                                         │ │
│ │ PO # 002668580-01      Status PO  O                  │ │
│ │ RP # 140637228-01      Queue Date    00/00/00        │ │
│ │ Tracking # 0637228     Item Open Date  03/10/89      │ │
│ │                        Last Receipt Date 06/07/89    │ │
│ │ Sub Items?  No                                       │ │
│ │ Comments?   No         Create Date   00/00/00        │ │
│ │ System Messages? Yes                                 │ │
│ │                                      Receivable Yes  │ │
│ │ Item Total $ 198.00                  TI Inspect Yes  │ │
│ │                                           Stock Yes  │ │
│ │ Item Type MTL Material                               │ │
│ │ Account Type Inventory               Send MFG Part No│ │
│ │                                                      │ │
│ │ TI Part # 2551726-0001   Rev A   Pin Ctr 0    DLD    │ │
│ │ MFG Part # _____                 Mark  │ │
│ │ Military Part # _____                      │ │
│ │ Description  │ RING, INK ABSORBENT │                 │ │
│ │                                                      │ │
│ │ Commodity 36108000        Process 00000000           │ │
│ │ PRINTING SUPPLIES, MI                                │ │
│ │ ⇩                                                    │ │
│ └─────────────────────────────────────────────────────┘ │
└─────────────────────────────────────────────────────────┘
```

Fig. 17

```
┌─────────────────────────────────────────────────────────────┐
│ =                    Buyer Workstation              ⇦  ⇨   │
│ Work Lists  Admin  Support  PO Attachments  Actions  Display  Windows    F1=Help │
│ ┌─────────────────────────────────────────────────────────┐ │
│ │                          ┌──────────────────┐          ⇦│ │
│ │                          │   Comments       │           │ │
│ │          PO # 0026688    │ Schedules        │ Status PO O           │ │
│ │                          │ Sub-Items        │ Queue Date 00/00/00   │ │
│ │          RP # 1406372    │ Special Clauses  │                       │ │
│ │       Tracking # 0637228 │ Signatures       │ Item Open Date 03/10/89│ │
│ │                          │ Routing          │ Last Receipt Date 06/07/89│ │
│ │            Sub Items? N  │ Alternate Ship To Adress │                │ │
│ │                          │ Payment Schedules│ Create Date 00/00/00   │ │
│ │      System Messages? Y  │ Receipts         │                       │ │
│ │         Item Total $ 198.00 │ Material Returned│ Receivable Yes      │ │
│ │                          │ System Messages  │ TI Inspect Yes         │ │
│ │                          └──────────────────┘ Stock Yes              │ │
│ │       Item Type MTL Material                                         │ │
│ │       Account Type Inventory            Send MFG Part No             │ │
│ │                                                                      │ │
│ │       TI Part # 2551726-0001           Rev A    Pln Ctr 0    DLD     │ │
│ │       MFG Part # _____                                      Mark   │ │
│ │                                                                      │ │
│ │       Description  │ PUBLICATION KIT, MO DEL 880 USERS MANUAL │      │ │
│ │                                                                      │ │
│ │                                                                      │ │
│ │           Commodity 7610200              Process 00000000            │ │
│ │                    MANUALS                                           │ │
│ │                                                                     ⇩│ │
│ └─────────────────────────────────────────────────────────┘ │
└─────────────────────────────────────────────────────────────┘
```

Fig. 18A

| | | Buyer Workstation | | | | |
|---|---|---|---|---|---|---|
| Work_Lists | Admin | Support | Actions | Display | Windows | F1=Help |

| | | | | Send Po to Supplier | | | |
|---|---|---|---|---|---|---|---|
| Sel 1 | | | | Send for Approval | | | |
| | PO # | | S | Send for Signatures | Sequence | Total Value | Part #/Description |
| | 000398735-01 | | CR | Print Draft | | 0.10 | 2220841-0001 |
| | 002101865-01 | | RE | Print Follow Up Report | | 1,997.00 | 2210359-0001 |
| | 002101865-02 | | CF | Return To Requisitioner | | 0.00 | 2557237-0001 |
| | 002101865-03 | | CF | Buyer Reassignment | | 0.00 | 2557217-0001 |
| | | | | WorkList Sort Options | | | |
| | 002365962-01 | | PC | WorkList Select Options | | 1,108.00 | 2555792-0001 |
| | 002372148-01 | | CF | Mark All | | 19,739.90 | 2557192-0001 |
| | 002372284-01 | | PC | Clear All | | 7,676.25 | 2221522-0001 |
| | 002372385-01 | | CF | | | 439.32 | 2220115-0002 |
| | | | | Update BWS Sort Key | | | |
| | 002372399-01 | | PO U | | | 3,769.00 | 0971000-0001 |
| | 002372399-02 | | CR-BUYU | | | 2,700.00 | 0539468-0002 |
| | 002372399-03 | | CR-BUYU | | | 400.00 | 2229023-0001 |
| | 002372433-01 | | PO U | | | 2,555.35 | 2229023-0001 |
| | 002372452-01 | | PO U | | | 60.97 | 2229023-0001 |
| | 002380020-01 | | CR-BUYU | | | 5,088.00 | 2229023-0001 |
| | 002380033-01 | | CR-BUYU | | | 7,770.00 | 2229023-0001 |
| | 002380033-02 | | PO U | | | 3,195.00 | 2557176-0001 |
| | 002380051-01 | | CR-BUYU | 07/21/89 | | 2,700.00 | 2248244-0005 |
| | 002380076-01 | | CR-BUYU | | | 995.00 | 0996698-0001 |
| | 002380182-01 | | CR-BUYU | | | 1,111.92 | 2229023-0001 |

AUTOMATED PROCUREMENT SYSTEM WITH MULTI-SYSTEM DATA ACCESS

TECHNICAL FIELD OF THE INVENTION

This invention relates to data processing computer systems, and more particularly to a computerized procurement system, which links multiple computer environments and which includes a buyer workstation that displays various procurement documents and accesses system-wide data.

BACKGROUND OF THE INVENTION

In any business, the procurement of products and services is likely to be a complicated process. Existing procurement methods involve handling a variety of documents, such as requests for purchase, purchase orders, purchase order change notices, and the like. These documents are printed and mailed or hand-delivered to various personnel types, such as managers, buyers, and suppliers. Each personnel type makes appropriate decisions, some based on information that is different than that used by other personnel types and some that are based on information that is global to more than one personnel type. Each personnel type uses or adds data contained in the procurement documents. During the process, a variety of retainment, copy, and attachment requirements apply to the different documents.

A need exists for an automated procurement system that reduces paper and provides electronic routing of appropriate information to all who are involved in the process. Ideally, the system should provide the information as needed by each person, with as little intervention by these users as possible.

One difficulty of providing such a system is related to the difficulty of transferring data among different computer systems. Existing computer systems are often categorized into three primary groups: mainframes, minicomputers, and microcomputers. Each of these groups uses different operating systems and different data formats. Although significant advances have been made in networks that link computers that are designed for compatibility, not all computer systems are easily linked and as a result, data transfer from one type of system to another is difficult.

Another difficulty in providing an automated procurement system is overcoming long-standing traditional methods of handling and routing documents. The system must provide an interface to the buyer that is easy to use, yet fulfills the demands of what can become a complex pattern of back and forth paper trails. In data processing involving the manipulation of large amounts of data, mainframe computer systems have traditionally been used. However, most advances in interactive data entry and decision-making have been in connection with smaller computer systems, often microcomputer or minicomputer-based and referred to as workstations.

An object of the invention is to combine the advantages of database capacity using mainframe computers and the advantages of user-interfacing using workstations, for automating the procurement process.

SUMMARY OF THE INVENTION

One aspect of the invention is an automated procurement method, using an interactive workstation having a local database and a buyer interface, in communication with a mainframe having a global database. The local workstation displays various documents used for procurement, which include information that is already supplied as well as queries for data to be filled in by a buyer. The buyer selects a particular document to be processed, and either the workstation or the buyer determines what support data is needed for processing the selected document. If the data is in the global data base, transfer software retrieves the data from the global database. Other programming displays the data at the workstation, receives data input from the buyer, and routes the document to other personnel involved in the procurement process. Regardless of whether the global data is supplied automatically or is requested by the buyer, the fact that its source is the mainframe rather than the workstation is transparent to the buyer.

A technical advantage of the invention is that paper flow in the procurement process is greatly reduced. The invention routes electronic documents to appropriate persons during the procurement process. Based on input data, business procedures, and data base information, the invention determines what data is required at each workstation and determines the correct path upon which to route documents. The invention simulates the paper trails typical of procurement, including attachments, approvals, and retention requirements.

BRIEF DESCRIPTION OF THE DRAWINGS

FIG. 1 is a block diagram illustrating the various computer systems in communication with a mainframe, each used as part of a procurement process.

FIG. 2 illustrates the user interface of the workstation of FIG. 1, in particular, a buyer statistics window.

FIG. 4 illustrates the user interface of the workstation of FIG. 1, in particular, a RP work list window.

FIG. 5 illustrates the user interface of the workstation of FIG. 1, in particular, a RP work list sort menu.

FIG. 6 illustrates the user interface of the workstation of FIG. 1, in particular, an opened RP document.

FIG. 7 illustrates the user interface of the workstation of FIG. 1, in particular, an RP attachments menu.

FIG. 8A illustrates the user interface of the workstation of FIG. 1, in particular, a delivery schedule attachment window.

FIG. 8B illustrates the user interface of the workstation of FIG. 1, in particular a quotes attachment window.

FIG. 9 illustrates the user interface of the workstation of FIG. 1, in particular, a support data menu.

FIG. 10 illustrates the user interface of the workstation of FIG. 1, in particular, a sourcing search window.

FIG. 11 illustrates the user interface of the workstation of FIG. 1, in particular, a commodity search window.

FIGS. 12A and 12B illustrate the user interface of the workstation of FIG. 1, in particular, action menus for a RP work list and an opened RP, respectively.

FIG. 13 illustrates the user interface of the workstation of FIG. 1, in particular, a PO work list specification menu.

FIG. 14 illustrates the user interface of the workstation of FIG. 1, in particular, a PO work list window.

FIG. 16 illustrates the user interface of the workstation of FIG. 1, in particular, a opened PO window.

FIG. 17 illustrates the user interface of the workstation of FIG. 1, in particular, a PO attachments menu.

FIGS. 18A and 18B illustrate the user interface of the workstation of FIG. 1, in particular, action menus for a PO work list and an opened PO, respectively.

DETAILED DESCRIPTION OF THE INVENTION

Figure 3:
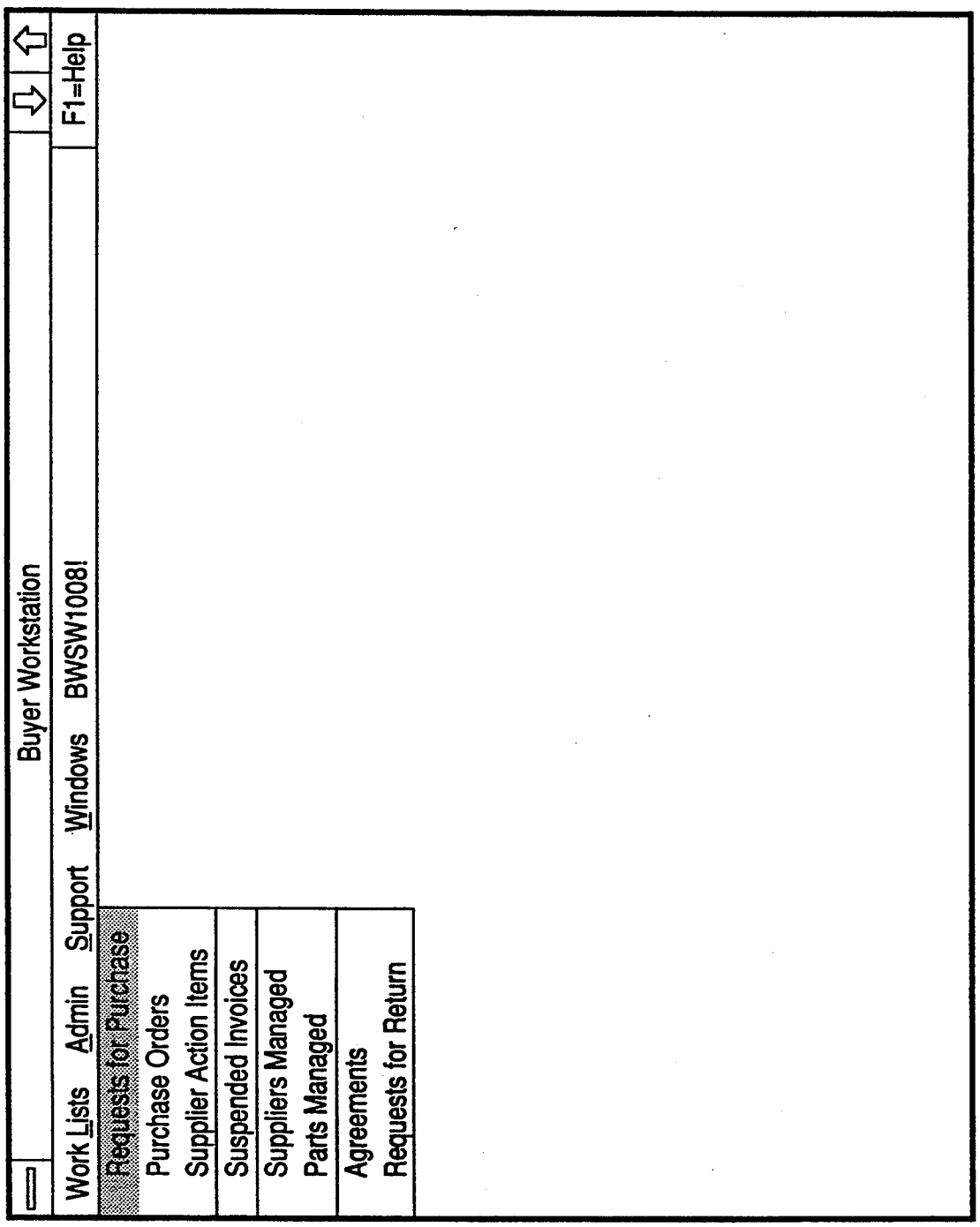
FIG. 3 illustrates the user interface of the workstation of FIG. 1, in particular, a work list menu.

FIG. 1 illustrates a procurement system, with which the invention is designed to be used. Several user systems are each in communication with a mainframe system 11. The user systems include buyer system 10, requisitioner system 12, supplier system 14, and manager system 13. As explained below, each user system may include standard computing equipment, such as a processing unit, communications interface, display screen, printer, and memory.

As explained below, the operating systems and applications programs of these user systems are not necessarily compatible. In fact, an advantage of the invention is that it provides access to global data that each of these systems may generate or use. Although examples of operating systems and applications for each system are described, these could be varied, with general concepts of the invention remaining the same.

Buyer system 10 is a system of buyer workstations 20, in communication with each other by means of a server 19. A user of a workstation 20 is referred to herein as a buyer. In the preferred embodiment, each buyer station 20 is a micro-computer, using an operating system known as OS/2. Various terms associated with OS/2 are used throughout this description, and are known to those familiar with OS/2.

The applications programs used with buyer station 10 include a database manager, which is a relational database. Other applications programming includes buyer interface software, which is described below in connection with FIGS. 2-19.

Server 19 provides data distribution to each workstation 20. Some of this data, which is common to all users of all workstations 20 is stored on server 19 and shared by all workstations 20. Other data may be stored at a workstation 20. Both types of data are referred to herein as "local data", as opposed to "global data" stored in mainframe 11.

An important aspect of the invention is a method of transferring data between buyer system 10 and mainframe system 11. The process of transferring data to buyer system 10 from mainframe system 11 is referred to herein as "downloading", whereas the process of transferring data from buyer workstation 10 to mainframe system 11 is referred to as "uploading". The programming of workstation 20 and server 19 programming that implement these processes are described in further detail below in connection with FIGS. 19 and 20.

In a typical procurement system, a number of buyer stations 20 are linked in a local area network (LAN), served by server 19. As will be explained below, however, server 19 is different from typical LAN servers in that it serves both the workstations 20 and mainframe 11. Also, the invention is not limited to local area networks, and the functions of server 19 and workstation 20 may be combined in a single computer unit. In this situation, the transfer software runs in the background while the buyer interacts with the application software in the foreground.

Mainframe system 11 includes at least one database, which stores global data to be accessed by one or more of the user systems. An example of mainframe system 11 is a mainframe computer system manufactured by IBM Corporation, using the MVS operating system and an Information Management System (IMS) teleprocessing monitor for interactive access via terminals. Although the following description is in terms of a single mainframe system 11, more than one mainframe computer may be in communication with each other as mainframe 11, provided that data downloading and uploading includes a means for identifying them.

The user systems other than buyer system 10 may be LAN systems, stand-alone workstations, or mainframe systems. A typical configuration is a mainframe system combined with local stations, which operate either as terminals or as workstations running local applications programming. Although the following paragraphs describe the user systems other than buyer system 10 in terms of specific configurations, the functionality of these user systems can be accomplished with different configurations and the concepts of the invention described herein are the same.

In the embodiment of this description, requisitioner system 12 and manager system 13 are mainframe systems, for example, mainframes using the IMS teleprocessing monitor. The applications programs for these mainframes use relational databases, such as Database 2 (DB2), manufactured by IBM Corporation. Example of a requisitioner system 12 and manager system 13 are the EZ REQ system and the Electronic Routing and Approval (ERA) system, both manufactured by Texas Instruments, Inc.

Supplier system 14 is a mainframe and IMS system and uses DL/I database application programs. An example of a supplier system is the TI Information Exchange System (TIIES), manufactured by Texas Instruments, Inc. The mainframe links with DOS workstations having databases, such as Btrieve, manufactured by Softcraft, Inc.

Buyer Workstation Interface

The user interface of each buyer workstation 20 is designed to handle a large volume and variety of data. A number of display panels are used to display and process this data. This visual presentation is modeled after a design approach known as multiple document interface, which includes a set of design rules for presenting multiple documents or different views of the same data in a consistent manner. A method of implementing a multiple document interface is the use of child display windows that operate under a top level parent window.

In the preferred embodiment, the user interface is implemented with the Presentation Manager shell, which is a well known companion to the OS/2 operating system. This permits the use of multiple display windows. A main menu process acts as the parent window for all buyer applications and manages their windows.

Consistent with the above design approach, each workstation 20 provides the buyer with appropriate documents for use during the procurement process. These documents are presented on a display screen as windows, with data fields to be considered by or to be filled in by the buyer, in a manner analogous to the data on forms and reports used in traditional non-automated procurement methods. Furthermore, each workstation 20 routes these documents to and from the various user systems as needed, with appropriate copies and attachments.

To provide these documents in an orderly manner, the application software for each workstation 20 includes processes for providing the buyer with documents, such as requests for purchase (RP's) and purchase orders (PO's). It displays these documents in display windows, and the buyer selects actions from command bars and menus. Buyer input is by means of a keyboard or mouse, or a combination of both. As will be evident from FIGS. 2–19, the invention is designed so that buyer input is facilitated with pick and choose selections via a mouse.

FIG. 2 illustrates a buyer statistics window 21, which informs the buyer of RP's and PO's assigned to the buyer's workstation 20. This window is obtained by means of the Admin command on the command line 22. The programming of workstation 20 automatically updates the data in this window 21.

FIG. 3 illustrates a work list menu 31, which is obtained by means of a Work List command on command line 22. As shown, various types of work lists may be obtained, including those listing RP's and PO's, as well as other types of documents. The particular work lists displayed on a workstation 20 contain documents assigned to the workstation 20. The reverse video 32 is a standard menu selection means.

As an example of work lists, communications between requisition system 12 and buyer system 10 permit a workstation 20 to inform a buyer that RP's require processing. In a typical procurement system, RP's are sent to a manager for approval, a step that the invention implements with manager system 13. Then, communications and application programming causes a list of RP's to be presented to the buyer on the display of workstation 20. Thus, a RP work list contains all RP's assigned to a workstation 20. The programming automatically updates the work list contents as new RP's are added and old RP's become PO's. Other work lists may list other procurement documents, such as PO's and requests for return, for which processing is to be done.

FIG. 4 illustrates an RP work list 41 obtained by selecting an appropriate command from the menu of FIG. 3. The work list represents each RP in a compressed form, having a single line of the most pertinent data contained in the RP's.

FIG. 5 illustrates a work list sort menu 51, which permits work lists to be sorted by various data fields. Referring again to FIG. 4, work list 41 is sorted in RP number sequence. However, using menu 51, selection criteria other than RP number may be used. Menu 51 may also be used to change the worklist data fields displayed in work list 41.

FIG. 6 illustrates an RP that has been opened, so that additional information is displayed. This opened RP 61 represents the data that would be contained on a hard copy RP in a non-automated system. The data fields include such items as part number, description, commodity code, supplier, and shipping destination. Some data is supplied by other user systems, such an RP number or a suggested supplier from requisition system 12, or comments and price approvals from manager system 13. Additional data fields may be included by scrolling the window. Some of the data fields are protected, for buyer viewing only. Other data fields are unprotected for receiving buyer input.

FIG. 7 illustrates a document attachment menu 71, which permits attachments to be viewed, created, or updated on a workstation 20. These attachments include comments for keeping notes, special schedules, subitems, special clauses, quotes, routing, and other supplemental attachments that simulate those used in a non-automated procurement process. Attachment menu 71 is a submenu of an opened RP window 61.

FIG. 8A illustrates one of the attachments available using the menu of FIG. 7, a delivery schedule window 81. Use of the Actions command 82 permits the buyer to add or modify data fields in this window. FIG. 8B illustrates a second attachment available using the menu of FIG. 7. This attachment permits a buyer to send and receive quotes. The returned quotes are one of several decision aids provided by the user interface.

When the buyer selects a particular document for processing, the programming of workstation 20 has previously determined what support information the buyer will most likely be using when the documents were downloaded. This decision is based on selected parameters, such as the buyer's division and purchasing history. The data is copied to a database on workstation 20 or accessible to it via server 19, such that it becomes local data. However, as explained below, the programming also permits the workstation to receive non-local data during document processing, either automatically or in response to buyer actions.

FIG. 9 illustrates a support data menu 91, which enables each workstation 20 to provide the buyer with supplemental data to help make purchasing decisions. Support information software is used to provide the buyer with administrative and decision-making data. For example, the buyer may obtain lists of suppliers and associated data such as prices, terms, and quality and delivery ratings.

As shown in FIG. 9, support data includes sourcing data, commodity searching, supplier searching, history searching, standard clauses, and on order data. The supplemental data is assigned to any open RP at the option of the buyer, who uses menus and command lines to select data categories and search fields.

FIG. 10 illustrates a sourcing search window 101, obtained by using the sourcing command of menu 91. Sourcing data is requested by a buyer who seeks purchasing information for a particular supplier or item. As an example of a sourcing process, a list of suppliers, ranked according to certain criteria is provided to the buyer. The criteria include characteristics such as quality and delivery, and each is given a numerical value, from which algorithmic or artificial intelligence techniques may be used to determine rankings.

FIG. 11 illustrates a commodity search window 111, obtained with the commodity search command on menu 91. Commodity data includes commodity codes and commodity descriptions. Other search windows (not shown) may provide various other data categories. Supplier data includes identification number, name, and address. History data includes past purchasing information on a particular item. Standard clauses are additional terms and conditions that the buyer may select to accompany a purchase order. 0n order data includes RP's and PO's that are currently on order. Each of these data categories has a number of data fields, and may be searched with respect to a selected field. For example, a buyer may search the commodity data using either the code or description as a search field.

FIGS. 12A and 12B illustrate action menus 121 and 122 for an opened RP and an RP work list, respectively. In addition to viewing work lists, opening documents, and obtaining supplemental information, the buyer may "act" on a document. These actions are the equivalent of handling hard copies of a document in a non-automated system. As shown, Actions may be selected from either an open document window as in FIG. 12A or a work list window as in FIG. 12B. Performing an action from a work list affects all listed documents that have been marked by the buyer. Performing an action from an open document affects only that document.

FIG. 13 illustrates a PO work list specification window 131. This window permits the buyer to create a PO work list that includes only PO's that meet selected criteria. For example, the buyer may create a work list of PO's for the same supplier.

FIG. 14 illustrates a PO work list window 141. The data in this window is automatically updated as the buyer receives new PO's and as existing PO's become filled orders. Once data is verified by mainframe 11, an RP is removed from the RP work list 41 and added to the PO work list 141.

Figure 15:
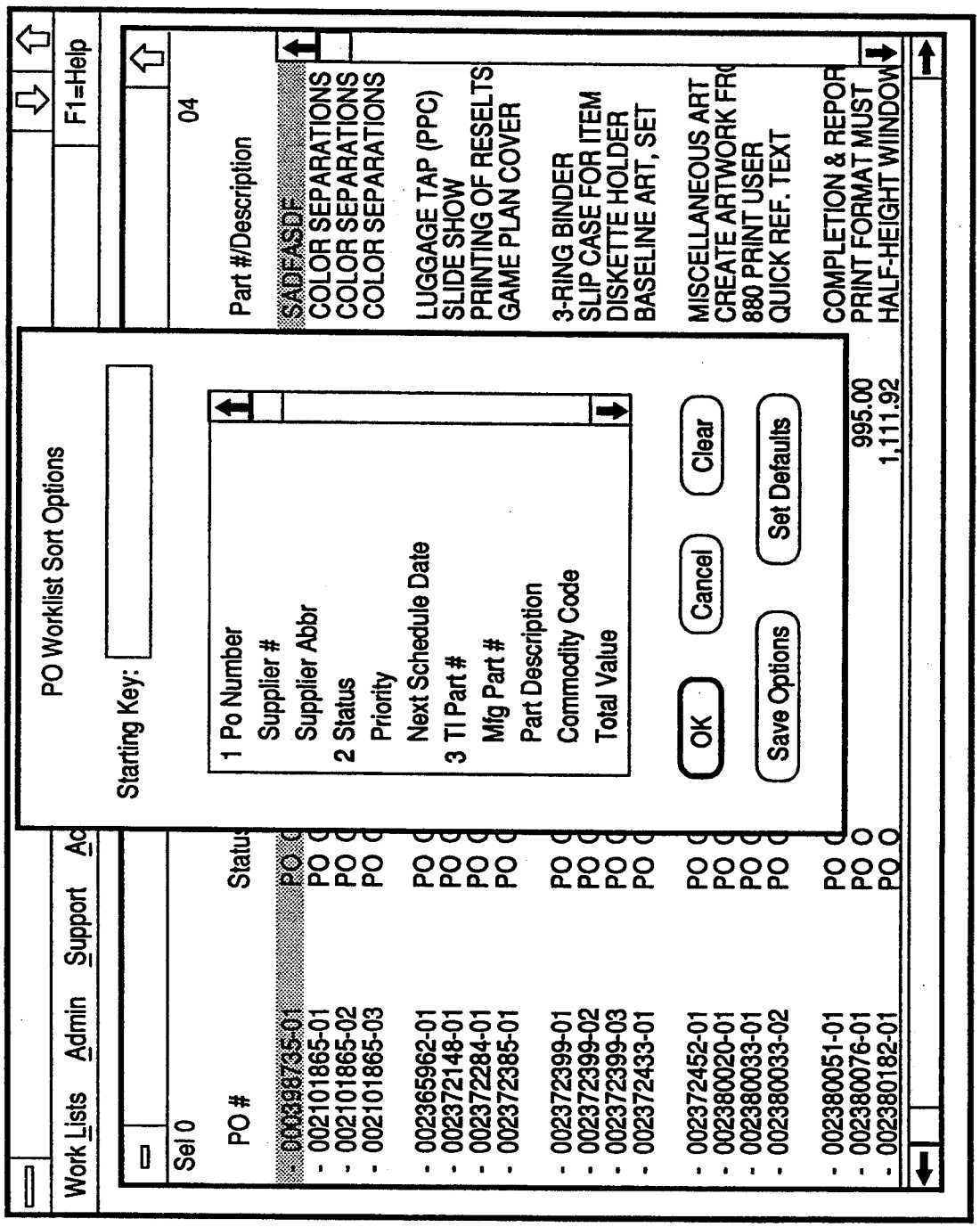
FIG. 15 illustrates the user interface of the workstation of FIG. 1, in particular, a PO work list sort menu.

FIG. 15 illustrates a PO work list sort menu 151, which permits the buyer to sort the PO work list 141 according to various data fields. For example, the work list 141 may be sorted by total value of the order.

FIG. 16 illustrates an opened PO window 161. Like opened RP's 61, opened PO's 161 represent data that would be contained in a hard copy PO of a non-automated method. Data fields in the PO may be protected or unprotected from input or modification by the buyer.

FIG. 17 illustrates a PO attachments menu 171. Like the RP attachments menu 71, PO attachments menu 171 permits the buyer to view, create, and update attachments that simulate those used in standard non-automated procurement systems. The attachments are the equivalent of the various physical documents that would be attached to a PO.

Figure 18B:
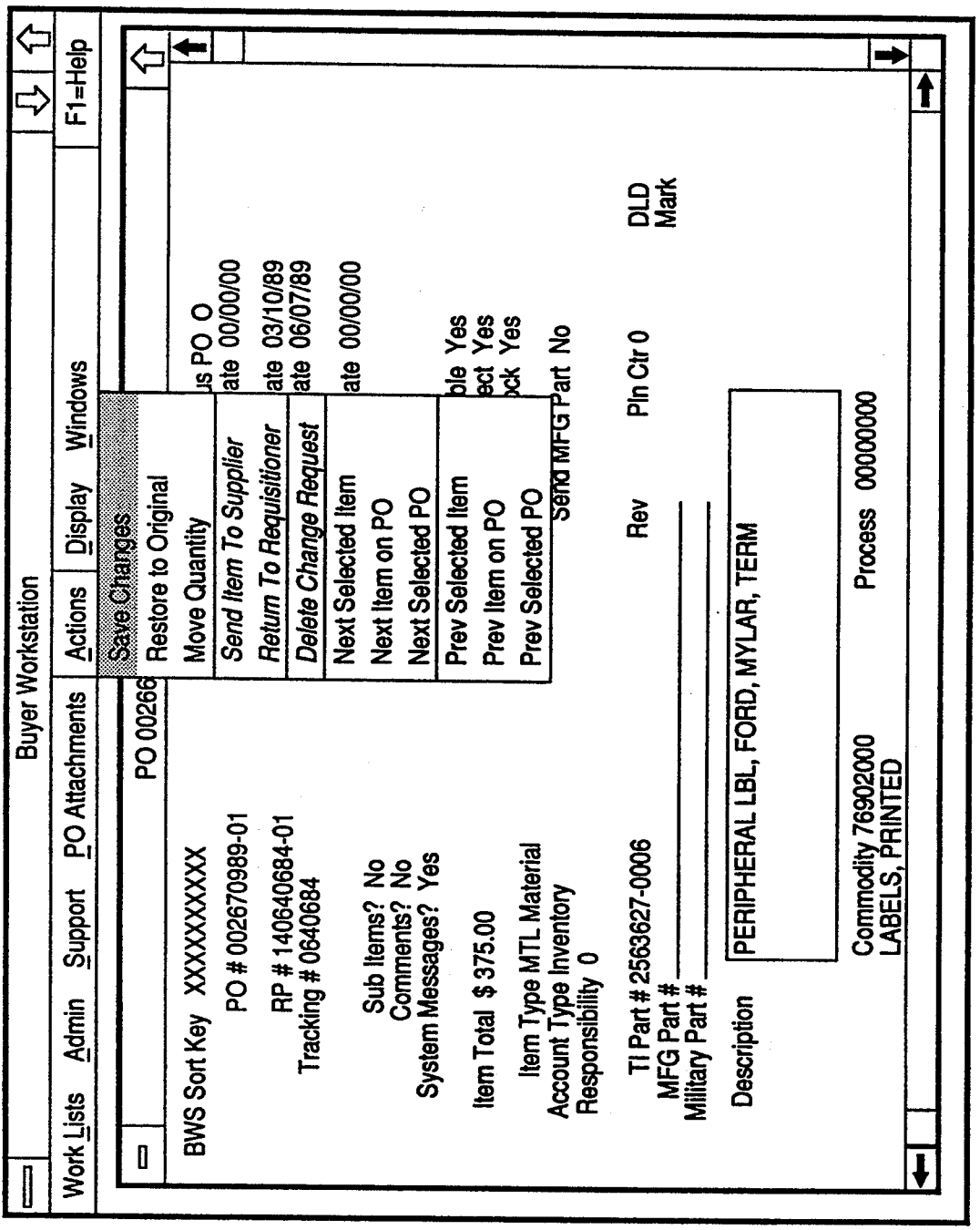

FIGS. 18A and 18B illustrate action menus 181 and 182 for PO work lists and opened PO's respectively. In a manner similar to actions taken with respect to RP's, the actions available from the PO action menu permit the buyer to select actions that are carried out by workstation 20 to simulate the procedures and routing of a non-automated system.

A feature of the invention is that printouts can be easily generated to provide hard copies of procurement documents and reports. These printouts can be generated either on-site for delivery to entities external to the system, or at a designated destination so that manual delivery is avoided.

Figure 19:
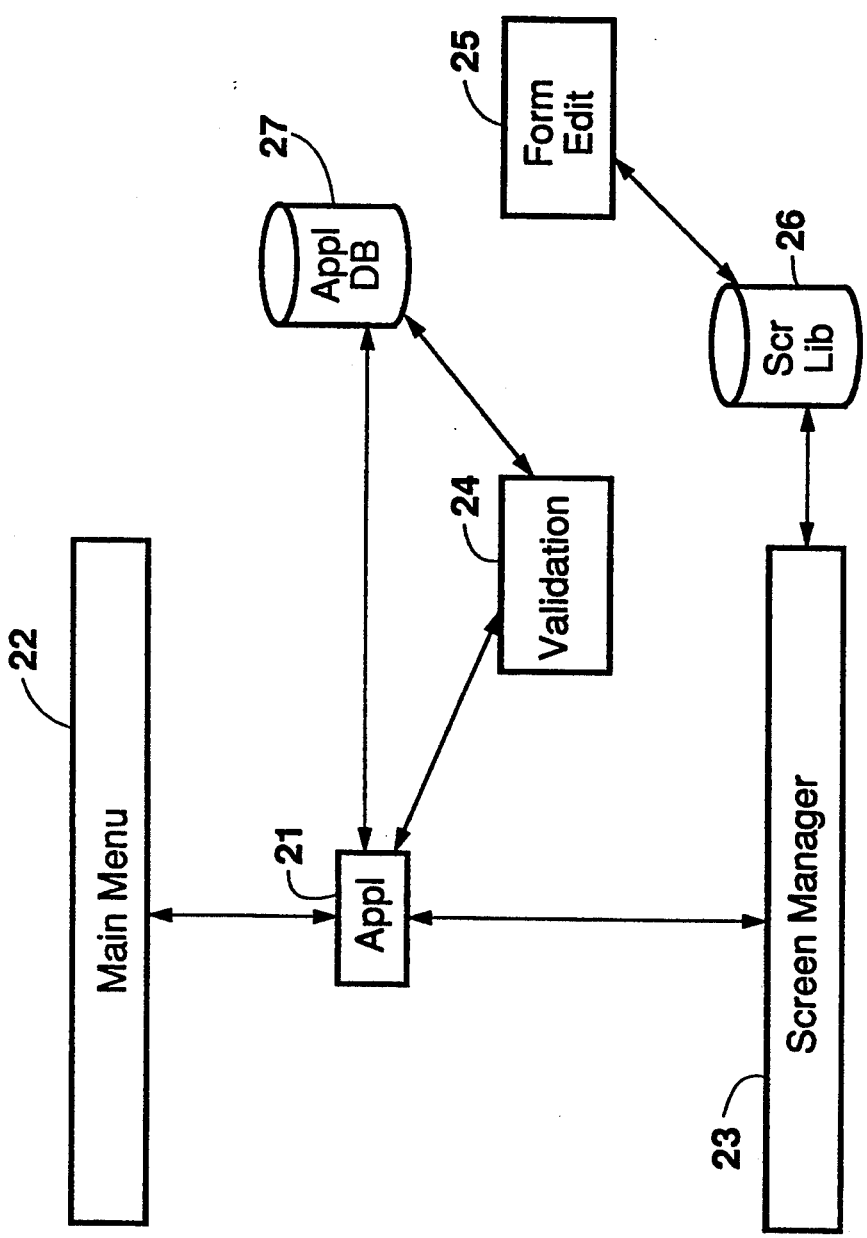
FIG. 19 illustrates the structure of the programming for one of the workstations of FIG. 1.

FIG. 19 illustrates the programming architecture of the software programs of buyer station 11 that manage the user interface. The general design of the programming surrounds application programming 21 with a layer of utility programs, which provide application-specific and generic services beyond those provided by OS/2 software. Thus, the application programming 21 is freed of the tasks of interfacing with the PM services of OS/2.

In addition to application program 21, the components of the workstation 20 software are: main menu 22, screen manager 23, validation functions 24, form edit 25, and a screen library 26. These utilities are closely coupled and in constant communication with each other. Each calls upon the others to perform services on behalf of application program 21.

Application program 21 is primarily a collection of screens to be presented to the buyer and tasks written for each screen. The task registers its window procedure with PM, calls a function of screen manager 23 to create a screen window, and calls another function of screen manager 23 to read the screen. Before the screen is displayed, non-literal fields are initialized, which may include a call to obtain current values from linked fields on other active screens.

Application program 21 dynamically modifies menu items entries to indicate what options are currently available to the user. This is accomplished by sending messages to main menu 22 when changes in menu choices are needed.

Main menu 22 is a driver program that controls the main menu and begins a task when the corresponding menu item is selected. When the buyer selects a menu item, main menu 22 notifies the application program 21, which then acts appropriately.

Screen manager 23 is a collection of routines that simplify screen management with an OS/2 PM menu driver interface. Screen manager 23 also controls buyer input via a mouse and keyboard. Screen manager 23 permits data fields on multiple screens to be linked so that when a field on one screen changes, fields on other screens that contain the same data are updated. Screen manager 23 has functions that handle window management functions, such as sizing, moving, and scrolling.

As a buyer runs an application program 21, the buyer can enter new data in data fields on the display of workstation 11. Screen manager 23 notifies the application program 21 of the change. Application program 21 causes validation of the data by invoking the validation functions 24. Validation involves such tasks as determining whether the data type is proper or whether data is factually true. An example of the latter is determining whether a supplier number is for an existing supplier.

Form edit 25 is a utility program used for designing screens. It maintains a disk file library of all screens, with a screen being comprised of a group of field descriptions. Fields can be of several format types, including text, numeric, list-box, edit-box, push-button, data, or zipcode formats. Each field may be given a name, which is used by a task to reference that field. Each field is located by the row-column position on the display screen, and its size is measured in terms of rows and columns. Colors are used to differentiate literal, protected, or unprotected fields, with literal fields being those with static data that is usually never changed. Other fields usually have initial values assigned by the task. Unprotected fields may be changed by the buyer. Fields have various attributes used to select visibility, keyboard protect status, numeric edit functions, text justification, etc. These attributes control how the field is displayed by screen manager 23. Field values and attributes may be changed and queried by the task using functions from screen manager 23. Different versions of these functions control different data types.

During run time operations, the tasks of applications program 21 use various messages, which are standard for OS/2 and PM. After initialization, the task enters a message loop to wait for and then respond to received messages, until it receives a WM_QUIT message. The task specifies a default window procedure, rather than a PM equivalent. All regular PM messages come to the task's window procedure, and the task gets priority to these messages. The task may ignore a message, in which case the message is handled by screen manager 23.

Application task message handling is mostly concerned with changes made to input fields and actions selected by the buyer. Most messages that are sent to the task concern a specific field, which is identified by field name.

One field attribute is notify, which a task may use to specify that it wants a notification message about any key stroke or any mouse click that happens in that field. Such messages identify the input that occurred and the field. An example, is a pushbutton field, which can be related to when a mouse button is pressed and which button. Screen manager 23 converts PM mouse messages, identified by pixel coordinates where the mouse clicked, to a workstation 11 mouse message which identifies the field name.

A task receives a validation message if the buyer modifies data in a field and attempts to move to another field. The task may then query the current value of the field, verify it, and refuse to permit the user to leave the field if the modification is unacceptable. If the buyer clicks on a menu or a close command after attempting to modify a field, the task intercepts the WM_CLOSE and WM_COMMAND messages, and calls a procedure that forces an immediate validation message for the field.

List-box fields are a special case, which require a series of messages requesting each additional line of data for the box. Initially, and again each time the field is scrolled, additional data is requested. Only enough data is requested to fill the visible part of the box. These messages are in the form of GetFirst, GetLast, GetNext, or GetPrevious queries. A line of data is returned to the task to be used as a key to obtain the next line, so that the task need not be involved with scrolling functions. When the buyer selects a list-box line the data on that line is returned to the task for identification of the line. Such selected lines can be marked visibly for the buyer, and are treated two ways as requested by the task—either all other lines are unmarked so only one is selected or all other lines are left as is so that several can be selected.

After an application program 21 receives and validates input from the buyer, it typically performs numerous database calls. These calls use the Structured Query Language (SQL) interface to retrieve, update, insert, and delete data columns and rows on the tables in the local database 27. Most of the code and logic of applications program 21 substantially involve database access to acquire the necessary data fields to populate screen displays for buyer interaction.

Global Data Downloading

Figure 20:
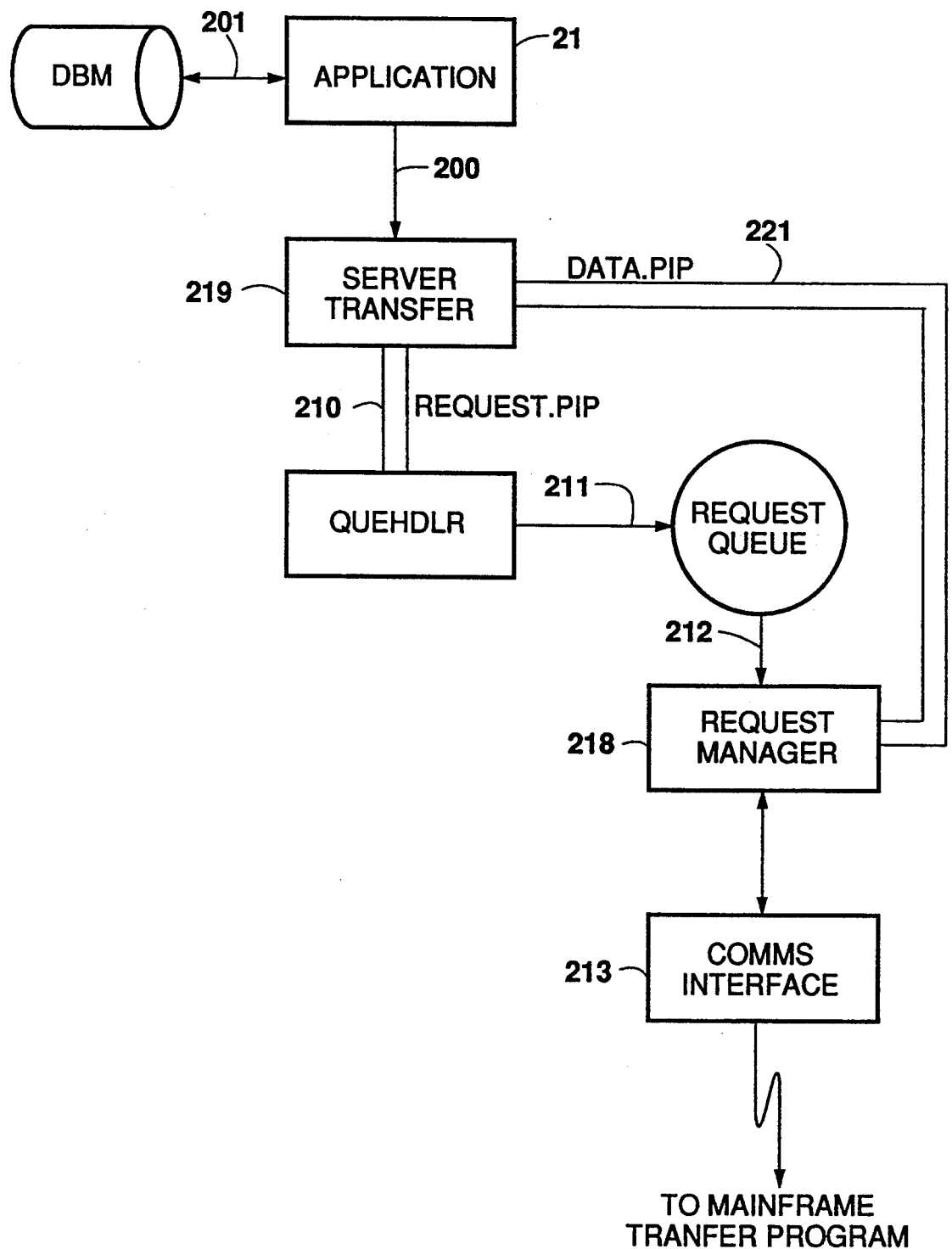
FIG. 20 illustrates the interactive data transfer process of a buyer system.
Figure 21:
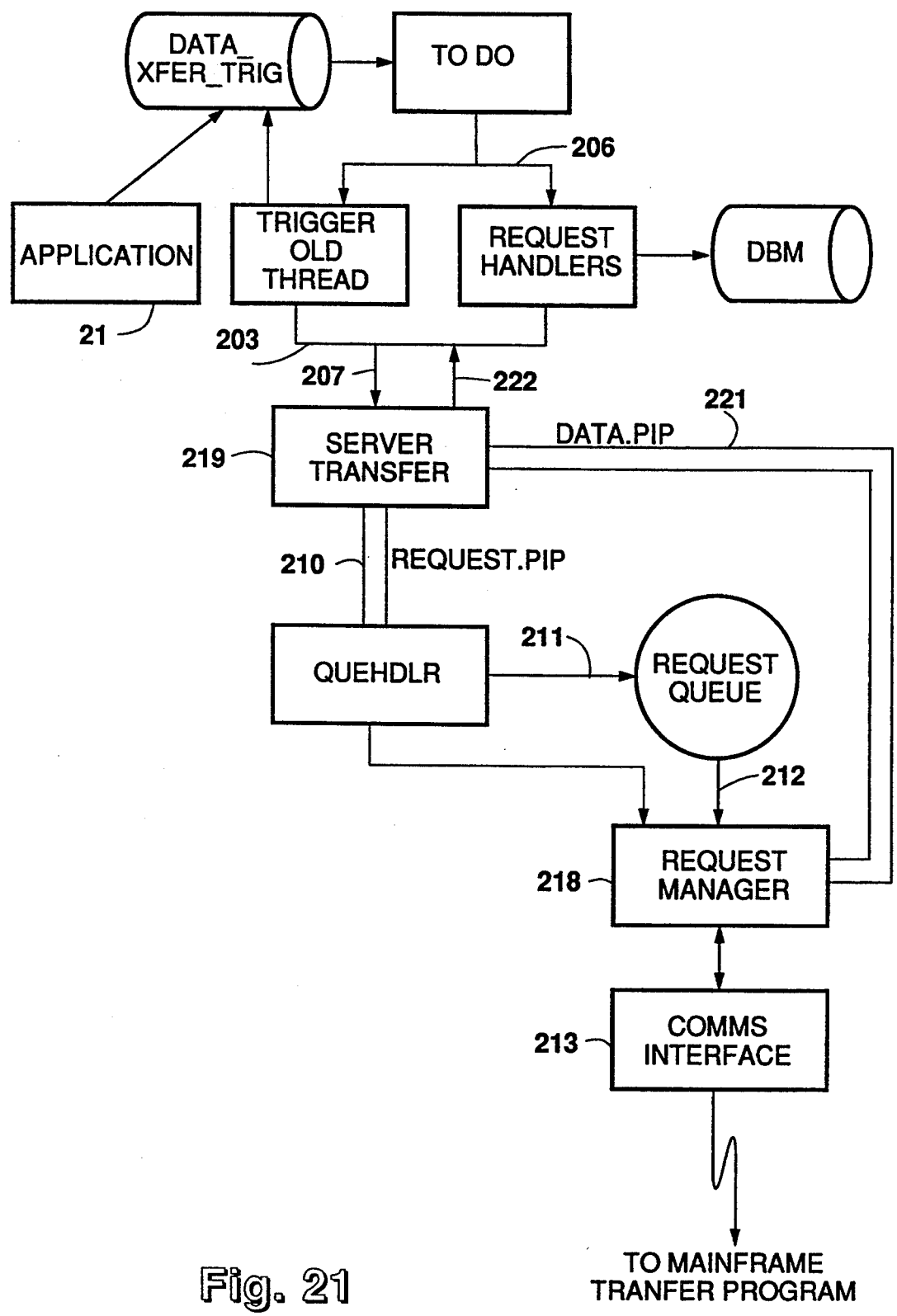
FIG. 21 illustrates the batch data transfer process of a buyer station.
Figure 22:
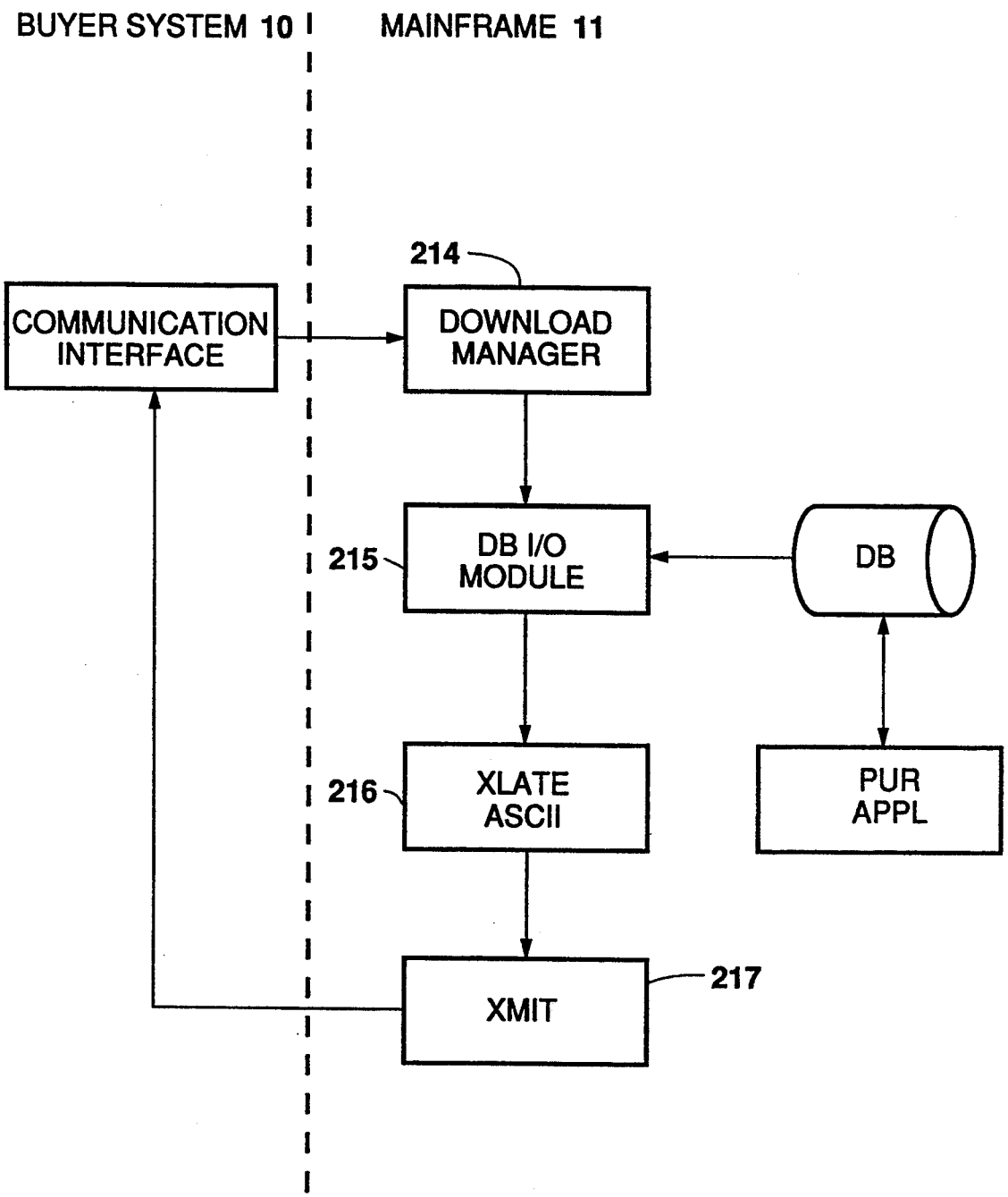
FIG. 22 illustrates the data transfer process of a mainframe for both interactive and batch data transfers.

FIGS. 20-22 illustrate the process of providing "transparent" access by workstation 20 to global data, which is stored on mainframe system 11. Two types of access are provided: interactive and batch. FIGS. 20 and 21 illustrate the transfer of data within buyer system 20 for interactive and batch access, respectively. FIG. 22 illustrates the transfer of data between mainframe 11 and buyer system 10 for both types of access.

Referring to FIG. 20, the interactive transfer process is used when a buyer is working on a document and needs data not found on the local database. In step 200, application program 21 determines that global database access is required and calls a server transfer program to download the data from mainframe 11. The server transfer program is described in further detail below.

The batch process is used in a number of different situations. Some examples of batch data transfer are: (1) when a new document is created or updated by a user system, such as requisitioner system 12, (2) when a locally updated document is validated, or (3) when a local document is processed such that it is to sent to another queue, for example, an RP to PO conversion. The batch process is based on triggers, which are database records that represent a logical set of data that is to be moved between a local database of buyer system 10 and mainframe 11.

Thus, as indicated by step 203, server 19 continually polls mainframe 11 for triggers. In step 204, the triggers are downloaded and stored in a local trigger table. Also, as indicated by step 205, application program 21 may insert triggers locally, such as in the cases of examples (2) and (3) in the preceding paragraph.

In step 206, a dedicated trigger to-do list process, which runs on server 19, schedules each trigger to a request handler that is appropriate for the request depending on the type of data requested and its location within mainframe 11. To-do list process is essentially a queue manager.

Referring to FIGS. 20 and 21, in both the interactive and the batch data transfer, the server transfer program transfers data between buyer system 10 and mainframe 11. FIGS. 20 and 21 illustrates various modules and functions of this server transfer program.

In the batch data transfer process, the request handler calls the server transfer program to initiate a transfer request. In the interactive data transfer process, the request is generated as a part of the application program 21 and a queue manager is not necessary. In both processes, the request contains information about the direction of data flow, i.e., whether it is to be uploaded or downloaded, the type of data, and the identity of the mainframe if the mainframe system 11 has more than one mainframe.

In step 210, the request is sent to a queue handler via an OS/2 named pipe. In step 211, the queue handler inserts the request into an OS/2 IPC queue for scheduling.

In step 212, a request manager reads the request from the queue. In step 213, a communications interface formats the data to an IBM 3270 structured field buffer for transmission to mainframe 11. The communications interface uses 3270 emulation software.

Within the structured field buffer is an IMS transaction code, which specifies what type of transfer is to occur and what IMS system the transaction should be executed on. The IMS transaction code, together with its associated structured fields are processed through the IMS message format service bypass mode.

Referring now to FIG. 22, the mainframe transfer program receives the request from the server transfer program in the form of the structured field buffer. FIG. 22 illustrates various modules and functions of this mainframe transfer program.

In the case of downloads, in step 214, a download manager receives the request and passes it to a request-unique DB I/O module, depending on the type of data requested and where it resides on the mainframe databases. This request-uniqueness is similar to the uniqueness in the request handlers of the generic transfer system.

In step 215, the DB I/O module obtains the requested data. For each row of data, the DB I/O module provides a descriptor table, which itemizes the types and sizes of each data column. Although this description assumes the source data is in a DB2 table, this is not necessary to the invention. The primary characteristic of the source data is that it may be described as data types appropriate for the particular database.

In step 216, the mainframe transfer program translates the outbound data from EBCDIC to ASCII. Each DB2 row is translated to a corresponding OS/2 DBM format row. The result is one or more structured field messages containing the requested data. This message is referred to herein as the "mainframe response". In step 217, the mainframe response is transmitted to buyer system 10.

Referring again to FIGS. 20 and 21, in step 218, the request manager receives the mainframe response from the mainframe transfer program. The request manager examines flags in the response header to determine if the download is finished or in-progress. The download is treated as being in-progress if the request represents more data than can be transmitted in a single IMS transaction. In that situation, the data is buffered and the IMS transaction is re-scheduled.

In step 219, the server transfer program returns each data record to the request handler via another OS/2 named pipe. The data is then inserted into the local database in the case of batch data transfers or passed to application program 21 in the case of interactive data transfers. Also, the appropriate worklist is notified, using a notification message, to display the new data.

Data Uploading

In data uploading, the source of the data is buyer system 10 instead of mainframe 11 and the destination for the data is mainframe 11 instead of buyer system 10. Uploading is initiated by a workstation 20 when a workstation application has changed data, and as a result the data must be validated or updated on a data base of a mainframe.

In the first step, application program 21 places an upload request into a workstation queue. The data items in the queue are flagged to prevent further user changes to that data until the upload is complete. The remaining steps of the data uploading process are the reverse of those described above for the downloading process. The upload process of the mainframe transfer program is similar to the download procedure, except that an upload manager replaces the download manager. Mainframe 11 returns an acknowledgement instead of downloaded data.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A method performed by a computer system implementing an automated procurement system including a mainframe computer, a global database, a local database and a server computer, comprising the computer performed steps of:

storing global data in said global database of said mainframe computer, said mainframe computer being programmed with mainframe transfer software;

storing local data in said local database of said server computer, said server computer being programmed with server transfer software so that said server computer is in communication with said mainframe computer;

controlling by said server computer a workstation for interactive input and output with a buyer, said workstation being programmed with a buyer interface, and said workstation being in communication with said server computer;

accessing said buyer interface to permit said buyer to process procurement documents;

determining by said server computer whether process data corresponding to said process of said procurement documents is located in said global data in said global database or in said local data in said local database;

controlling by said computer system a manager system to approve said procurement documents after said procurement documents are processed; and providing, by said mainframe transfer software and said server transfer software, said process data to said buyer so that a location of said process data is determined without interaction of said buyer; and wherein the method further comprises the step of supplying said global data from said global database for use by said buyer for decision-making; and wherein said global data includes supplier rankings including criteria data to rank each supplier with respect to other suppliers, and the method further comprises the steps of determining by the computer system said supplier rankings, displaying said supplier rankings on said workstation, and receiving input from said buyer responsive to said supplier rankings.

2. A method performed by a computer system for automated procurement, using an interactive workstation having a local database and a buyer interface, in communication with a mainframe having a global database, comprising the computer performed steps of:

displaying a plurality of documents used for procurement on said workstation, said documents including queries for data to be supplied by a buyer;

selecting a document on said workstation from said documents;

determining by said workstation whether support data is needed for processing said selected document and supporting said selected document is located in said global database;

retrieving by said workstation said support data from said global database if needed to support said selected document in accordance with said determining step;

displaying said support data on said interactive workstation if needed to support said selected document in accordance with said determining step;

ranking by said computer system suppliers to rank each supplier with respect to other suppliers in response to a request for said support data;

receiving input data from said buyer in response to displaying said support data for processing said document, by using said buyer interface; and updating and maintaining said support data so that said support data in said local database is the same as said support data in said global database by said computer system.

3. The method of claim 2, wherein said method further comprises the step of routing said document to appropriate users of other computer systems, said other computer systems being in communication with said mainframe.

4. The method of claim 2, wherein said method further comprises the step of using said workstation to inform said buyer of a worklist of documents requiring processing.

5. The method of claim 4, wherein said worklists include a line of data representing a single document and the method further comprises the step of selecting an additional document from said worklist to be initialized for display of additional data.

6. The method of claim 4, wherein said method further comprises the step of sorting said worklist according to a data field selected by said buyer.

7. The method of claim 2, wherein said method further comprises the step of selecting and processing attachments to said selected document by said buyer.

8. The method of claim 2, wherein the method further comprises the step of determining said support data needed for processing, by using said buyer interface.

* * * * *